April 27, 1965 R. W. A. SCARR ETAL 3,181,005

COUNTER EMPLOYING TUNNEL DIODE CHAIN AND RESET MEANS

Filed Feb. 2, 1962 2 Sheets-Sheet 1

Inventor
ROBERT W.A.SCARR
IGOR ALEKSANDER
ROBERT W.HUNT
By [signature]
Attorney

COUNTER EMPLOYING TUNNEL DIODE CHAIN AND RESET MEANS

Filed Feb. 2, 1962 2 Sheets-Sheet 2

Inventor
ROBERT W.A. SCARR
IGOR ALEKSANDER
ROBERT W. HUNT
By [signature]
Attorney United States Patent Office 3,181,005

Patented Apr. 27, 1965

3,181,005

COUNTER EMPLOYING TUNNEL DIODE CHAIN AND RESET MEANS

Robert Walter Alister Scarr, Igor Aleksander, and Robert William Hunt, all of London, England, assignors to International Standard Electric Corporation, New York, N.Y., a corporation of Delaware Filed Feb. 2, 1962, Ser. No. 170,771
Claims priority, application Great Britain, Feb. 6, 1961, 4,382/61
8 Claims. (Cl. 307—88.5)

This invention relates to a multi-stable circuit such as a scaling circuit.

In an article entitled "High Speed Scalers Using Tunnel Diodes" by P. Spiegel (Review of Scientific Instruments, July 1960), there is described a scaling circuit employing a plurality of tunnel diodes connected in series and each resistance of a supply of substantially constant current. This article has specified that the tunnel diodes to be used are to be selected to have as close a degree of uniformity in their electrical characteristics as is possible.

Contrary to what has hitherto been thought, it has been found that in multi-stable circuits, such as scaling circuits, employing a number of tunnel diodes connected in series, the characteristics of any one diode must be different from any other diode of the chain.

According to the invention, there is provided a multi-stable circuit including a chain of tunnel diodes connected in series, the peak current of any one tunnel diode in the chain being different from the peak current of any other tunnel diode in the chain, wherein there is provided means for applying to said chain a substantially constant current having a value greater than the greatest valley current of any tunnel diode in said chain and less than the lowest peak current of any tunnel diode in said chain, whereby any tunnel diode in said chain is in the one or the other of two stable states of conduction, and wherein there is provided means for applying a current pulse to said chain whose characteristics are such as to switch from its one state to its other state the tunnel diode of lowest peak current which is in its said one state.

An embodiment of the invention will now be described with reference to the accompanying drawings in which.

Figure 1:
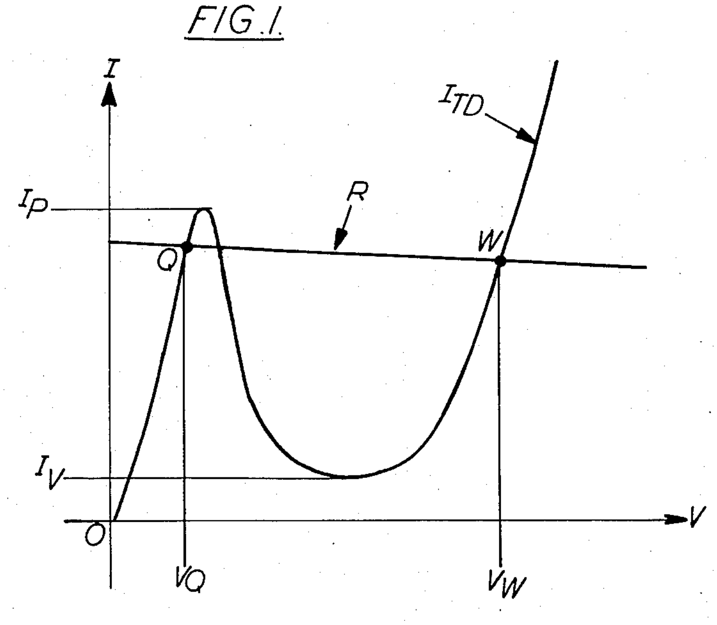
FIG. 1 shows the characteristic current-voltage relationship of a tunnel diode.

Referring to FIG. 1, in which there is illustrated a typical tunnel-diode current-voltage relationship, $I_p$ is the peak current of the tunnel diode and $I_v$ its valley current. The almost horizontal line R represents the resistance of a source of substantially constant current and the points of intersection Q and W indicate the two stable modes of conduction, which will also be referred to as the low-voltage and high-voltage states, respectively. The peak and valley currents are subject to variation between diodes as a result of normal manufacturing tolerances, but the voltage at which the peak current occurs is largely dependent only on the type of semiconductor material used in the manufacture of the tunnel diode.

Figure 2:
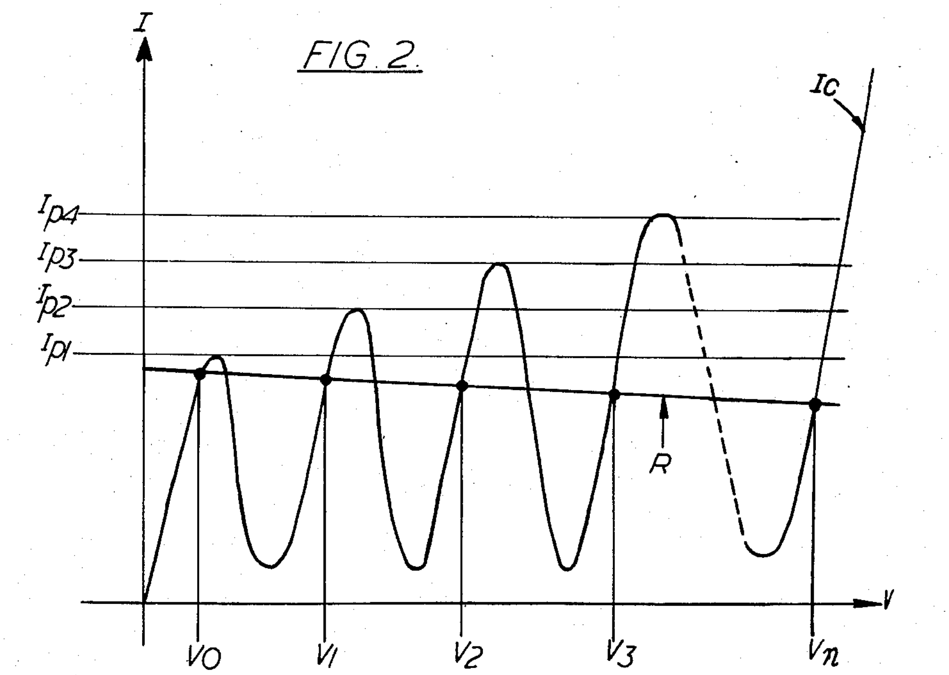
FIG. 2 shows the composite current-voltage relationship of $n$ series-connected tunnel diodes.

In FIG. 2, there is shown the type of characteristic produced by a number $n$ or of series-connected tunnel diodes having different values of peak current. When such a chain of tunnel diodes is fed from a current source, then in the manner shown in FIG. 2, a multi-stable circuit is obtained, having $(n+1)$ stable states and wherein the voltage across the chain of tunnel diodes is a multi-valued function, i.e. $V_0$, $V_1$, $V_2$, $V_3$ and $V_4$ are the possible voltage states of the chain.

An essential requirement for the chain of the embodiment described herein is that the valley current of the $n$th tunnel diode be less than the peak current of the diode having the lowest value of peak current, to enable a value for the resistance R to be chosen, which will insure that the load line intersects all the negative- resistance regions of the composite characteristic. It is, however, envisaged that, in further embodiments, this requirement will be obviated by the use of positive current feedback.

Figure 3:
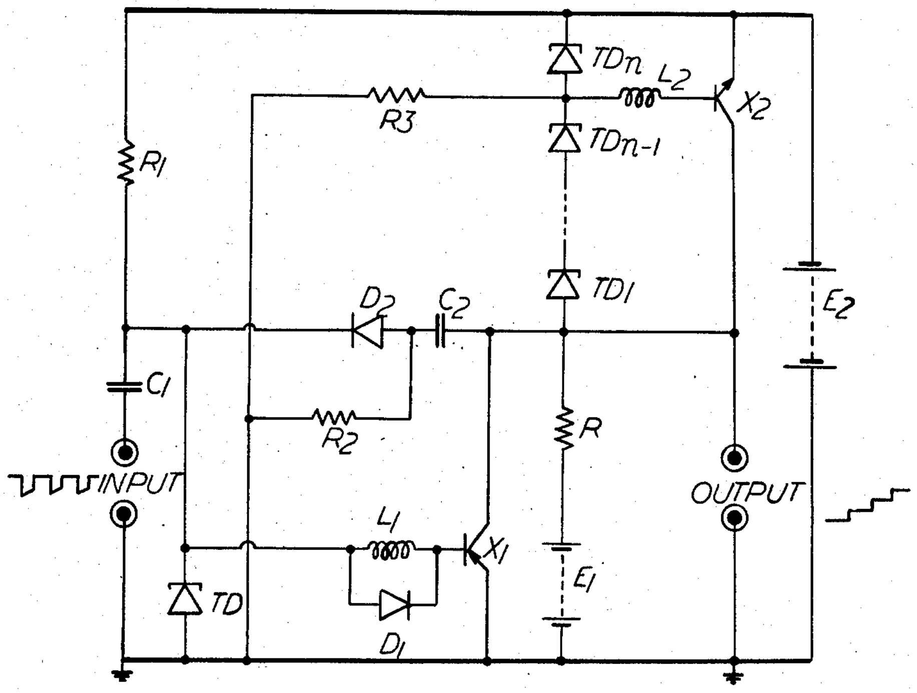
FIG. 3 shows an embodiment of the multi-stable circuit adapted to operate as a scaling circuit.

In FIG. 3, a basic circuit of an $n$-count scaler is shown. The tunnel diode TD is switched to the high-voltage state by a negative-going input pulse. The resultant voltage step turns on the transistor $X_1$ by driving into its base a current, the rate of rise of which is substantially exponential by virtue of the presence of inductor $L_1$. This current, amplified by the transistor $X_1$, is fed to the tunnel-diode chain in parallel with the current from the source of potential $E_1$ through the load resistance R. If the tunnel-diode chain is assumed to have the initial state corresponding to $V_0$, then as the current rising in consequence of an applied input pulse reaches $I_{p1}$, the first tunnel diode, i.e. that having the lowest value of peak current, will change from the low-voltage state to the high-voltage state. By virtue of the increase of potential across the chain, a positive-going pulse will be applied through the capacitor $C_2$ and the rectifying diode D2 to the input tunnel diode TD, switching the latter back to its low-voltage state. This voltage step drives the transistor $X_1$ towards cut-off, the rectifying diode $D_1$—which in the preferred embodiment is a backward diode—by-passing the inductor $L_1$ for this positive-going resetting pulse to reduce the effect of this inductor in slowing down the resetting pulse. The circuit is now ready to receive and respond to the next input pulse.

The tunnel diode $TD_n$ has the highest value of peak current and, hence, is the last to change state on the application of a train of $n$ input pulses. On changing state, the tunnel diode $TD_n$ causes current to be driven into the base of the transistor $X_2$, turning the latter on and effectively shunting the whole tunnel-diode chain with a comparatively low resistance, thus resetting the entire chain to the condition corresponding to $V_0$. The inductor $L_2$ serves to delay the resetting action until after the transistor $X_1$ has ceased to conduct. The resistor $R_3$ causes an additional current to flow through the tunnel diode $TD_n$ to ensure that, during the resetting of the chain, this tunnel diode will be the last one in the chain to return to its low-voltage state so that the chain-resetting pulse is not removed from the transistor $X_2$ until all the tunnel diodes in the chain have been returned to their low-voltage condition. The voltage change across the chain when it is being reset is much larger than the change resulting from a single tunnel diode being switched from its low-voltage state to its high-voltage state, and consequently provides a convenient output pulse, which, being negative going, is prevented by the diode D2 from being transmitted to the input tunnel diode TD.

A simplification of the circuit may be made where the maximum interval between successive input pulses is rather greater than the period corresponding to the cut-off frequency of the tunnel diodes in the chain. In such a case, the resistor R2 may be omitted and the diode D2 be replaced by a direct connection between the capacitors C1 and $C_2$, the latter being of relatively lower capacitance, thereby offering a high impedance to the relatively slow transient due to the "bottoming" of the transistor $X_2$ during the resetting action, but yet sufficiently large to transmit a large enough charge to switch the input tunnel diode TD to the low-voltage state when any one of the tunnel diodes in the chain switches to the high-voltage state.

The scaling circuit described above, and illustrated by FIG. 3, is one embodiment of the multi-stable circuit which includes a chain of tunnel diodes having unequal peak currents. In another embodiment, for example, the chain of tunnel diodes, preceded by an input circuit not differing substantially in principle from the input circuit described herein, may be used as an analog-to-digital converter.

What we claim is:

1. A multistable circuit including a chain of tunnel diodes connected in series, the peak-current switching characteristic of any one tunnel diode in the chain being different from the peak-current switching characteristic of any other tunnel diode in the chain, means for applying to said chain a substantially constant current having a value greater than the greatest valley current of any tunnel diode in said chain and less than the lowest peak current of any tunnel diode in said chain, whereby any tunnel diode in said chain is maintained in one or the other of two stable states of conduction, means for applying a current pulse to said chain to switch from said one state to said other state the tunnel diode of lowest peak current which is in said one state, and means for applying the change in voltage, resulting from the switching of said last-named tunnel diode, to an impedance coupled to an input of said means for applying a current pulse, whereby feedback action is obtained.

2. A multistable circuit according to claim 1 wherein said change in voltage resulting from a particular one of said tunnel diodes being switched from said one state to said other state is applied to a switching means adapted to vary the potential across the tunnel diodes in said chain in such a way that any tunnel diodes in said chain which are in said other state are switched into said one state.

3. A multistable circuit according to claim 2 wherein said change in voltage is applied to said switching means via an impedance adapted to delay the application of said change in voltage to said switching means.

4. A multistable circuit according to claim 2 wherein said switching means comprises a transistor having its emitter electrode connected to one end of said chain, its collector electrode to the other end of said chain and wherein said change in voltage is applied to the base electrode of said transistor.

5. A multistable circuit according to claim 1 wherein one tunnel diode in said chain is additionally connected to a means for applying bias current of sufficient magnitude to render said one tunnel diode the least responsive in said chain to a variation of potential across said chain when said potential is varied in such a way that any tunnel diodes in said chain in said other state are switched into said one state.

6. A multistable circuit according to claim 1 wherein said means for applying a current pulse comprises a bistable circuit element, which on changing from its first state of conduction to its second state of conduction initiates said current pulse and on changing from said second state to said first state terminates said current pulse.

7. A multistable circuit according to claim 6 wherein said bistable circuit element is switched from said first state to said second state by input pulses and from said second state to said first state by pulses derived from a variation in potential across said chain.

8. A multistable circuit according to claim 6 wherein said bistable circuit element is a further tunnel diode coupled to said chain via a delay network whose characteristics are such that the leading edge of said current pulse has a duration which is considerably longer than the time required for said further tunnel diode to switch from said first state to said second state.

References Cited by the Examiner

UNITED STATES PATENTS

| | | | |
|---|---|---|---|
| 3,050,637 | 8/62 | Kaufman | 307—88.5 |
| 3,094,630 | 6/63 | Rapp et al. | 307—88.5 |
| 3,094,631 | 6/63 | Davis | 307—88.5 |

OTHER REFERENCES

IBM Technical Disclosure Bulletin, page 81, vol. 3, No. 10, March 1961, "N-Valued Logic Circuits" by Baskin.

IBM Technical Disclosure Bulletin, page 55, vol. 4, No. 5, October 1961 "T.D.Nor and Nand Circuits" by Masher.

ARTHUR GAUSS, *Primary Examiner.*